US012567364B1

(12) United States Patent
Pieri et al.

(10) Patent No.: US 12,567,364 B1
(45) Date of Patent: Mar. 3, 2026

(54) DISPLAYS WITH LOCALLY BOOSTED CONTRAST

(71) Applicant: Apple Inc., Cupertino, CA (US)

(72) Inventors: Elizabeth Pieri, Menlo Park, CA (US);
Teun R Baar, Culemborg (NL);
Alexander G Berardino, San
Francisco, CA (US)

(73) Assignee: Apple Inc., Cupertino, CA (US)

( * ) Notice: Subject to any disclaimer, the term of this
patent is extended or adjusted under 35
U.S.C. 154(b) by 0 days.

(21) Appl. No.: 18/940,024

(22) Filed: Nov. 7, 2024

Related U.S. Application Data

(60) Provisional application No. 63/606,530, filed on Dec.
5, 2023.

(51) Int. Cl.
*G09G 3/3225* (2016.01)
*H04N 23/741* (2023.01)

(52) U.S. Cl.
CPC ......... *G09G 3/3225* (2013.01); *H04N 23/741*
(2023.01); *G09G 2320/066* (2013.01)

(58) Field of Classification Search
CPC ........... G09G 3/3225; G09G 2320/066; H04N
23/741
See application file for complete search history.

(56) References Cited

U.S. PATENT DOCUMENTS

| | | | |
|---|---|---|---|
| 8,964,298 B2 | 2/2015 | Haddick et al. | |
| 9,097,891 B2 | 8/2015 | Border et al. | |
| 10,055,887 B1 | 8/2018 | Gil et al. | |
| 10,203,762 B2 | 2/2019 | Bradski et al. | |
| 10,390,009 B1 | 8/2019 | Chen et al. | |
| 10,963,998 B1* | 3/2021 | Baar ......................... | G09G 5/10 |
| 11,327,312 B2 | 5/2022 | Robaina et al. | |
| 2018/0139429 A1 | 5/2018 | Park et al. | |
| 2018/0330674 A1 | 11/2018 | Baar et al. | |
| 2021/0027435 A1* | 1/2021 | Tao ........................... | G09G 5/14 |
| 2023/0196524 A1* | 6/2023 | Kim ..................... | H04N 19/117 |
| | | | 382/274 |
| 2024/0205376 A1* | 6/2024 | Luo ........................... | G06T 5/92 |

OTHER PUBLICATIONS

U.S. Appl. No. 18/353,985, filed Jul. 18, 2023.

* cited by examiner

*Primary Examiner* — Hang Lin
(74) *Attorney, Agent, or Firm* — Treyz Law Group, P.C.;
Kendall P. Woodruff

(57) ABSTRACT

An electronic device may be provided with a display. The
display may be configured to display standard dynamic
range image content and high dynamic range image content
at the same time. The standard dynamic range image content
may include one or more regions of locally boosted contrast
in regions adjacent to high dynamic range image highlights.
This prevents the appearance of grayish whites in standard
dynamic range image content while allowing the high
dynamic range highlights to take full advantage of the
dynamic range of the display. The size and shape of the
regions of locally increased contrast may be based on the
size and shape of the high dynamic range highlights, the size
of the display, the distance between the user and the display,
and/or the percentage of the display that is dedicated to high
dynamic range image content.

20 Claims, 5 Drawing Sheets

SEPARATE SDR CONTENT FROM HDR CONTENT ~ 100

EXTRACT HIGHLIGHTS FROM HDR CONTENT ~ 102

GENERATE MAP OF GAIN VALUES BASED ON HIGHLIGHTS ~ 104

APPLY TEMPORAL FILTER ~ 106

MULTIPLY SDR CONTENT WITH MAP OF GAIN VALUES TO LOCALLY INCREASE CONTRAST OF SDR CONTENT ~ 108

DISPLAY HDR CONTENT AND LOCALLY MODIFIED SDR CONTENT ~ 110

DISPLAYS WITH LOCALLY BOOSTED CONTRAST

This application claims the benefit of U.S. provisional patent application No. 63/606,530, filed Dec. 5, 2023, which is hereby incorporated by reference herein in its entirety.

FIELD

This relates generally to electronic devices, and, more particularly, to electronic devices with displays.

BACKGROUND

Electronic devices often include displays. Some displays may be used to display high dynamic range images and standard dynamic range images. If care is not taken, white content in standard dynamic range images may appear gray instead of white in the presence of high dynamic range images.

SUMMARY

An electronic device may be provided with a display. The display may be configured to display standard dynamic range image content and high dynamic range image content at the same time. To preserve the white appearance of white content in standard dynamic range images, the standard dynamic range images may include one or more regions of locally boosted contrast in regions adjacent to highlights in the high dynamic range image content. This prevents the white in standard dynamic range image content from appearing gray while allowing the highlights to take full advantage of the dynamic range of the display. The size and shape of the regions of locally increased contrast may be based on the size and shape of the highlights, the size of the display, the distance between the user and the display, and/or the percentage of the display that is dedicated to high dynamic range image content.

During operation, control circuitry in the electronic device may extract highlights from the high dynamic range image content and may generate a gain map based on the highlights. The gain map may include a gradient of strength that is higher at closer distances to the highlights and lower at farther distances from the highlights. The control circuitry may optionally apply a temporal filter to the gain map to avoid abrupt adjustments as highlights move across the display (e.g., during a movie). The control circuitry may multiply the standard dynamic range image content with the gain map to produce the regions of locally boosted contrast. Black content in the regions may remain unmodified by the gain map, while non-black content may receive a luminance boost to increase contrast in regions of standard dynamic range image content that is adjacent to high dynamic range highlights.

DETAILED DESCRIPTION

An electronic device may include a display. The display may be configured to display images that contain standard dynamic range image content and high dynamic range image content. In some image frames, the standard dynamic range image content and high dynamic range image content may be displayed at the same time. If care is not taken, the presence of high dynamic range image content can make the white in standard dynamic range image content appear gray (e.g., with reduced contrast), due to the difference in brightness between the "white" in the standard dynamic range content and the "white" in the high dynamic range content. This difference in peak brightness levels between standard dynamic range image content and high dynamic range image content is sometimes referred to as headroom.

To avoid the appearance of grayish whites in standard dynamic range image content when it is displayed with high dynamic range content, the contrast of the standard dynamic range content may be locally boosted in regions near the high dynamic range content. This may be achieved by multiplying the standard dynamic range image content with a map of gain values that is generated based on the highlights of the high dynamic range image content. The map of gain values (e.g., the strength and range of the map) may also be based on the size of the display, the distance between the display and the user, a percentage of screen coverage used by the high dynamic range image content, the type of content being displayed (e.g., a movie, a message, a photograph, etc.), whether the content is associated with an active or selected window, and/or based on other factors.

Locally boosting contrast of the standard dynamic range image content instead of reducing the available headroom for the high dynamic range image content allows the display to avoid grayish whites while also taking full advantage of the high dynamic range of the display. This is, however, merely illustrative. If desired, the amount of headroom available for high dynamic range image content may be adjusted in addition to or instead of locally boosting contrast of the standard dynamic range image content. Headroom may be adjusted based on various factors such as average pixel luminance levels (e.g., average pixel luminance levels of the high dynamic range content and/or average pixel luminance levels of the standard dynamic range image content), screen coverage, which image content is associated with an active or selected window, whether the image content is displayed in a grid view or an embedded view, whether the image content is displayed in a full-screen mode or a split-screen mode, which application is being used to display the image content (e.g., a photo editing or movie editing application versus a messaging application), display mode (e.g., whether the display is operating in a light versus dark display mode), user settings and/or user preferences, and/or other factors.

Figure 1:
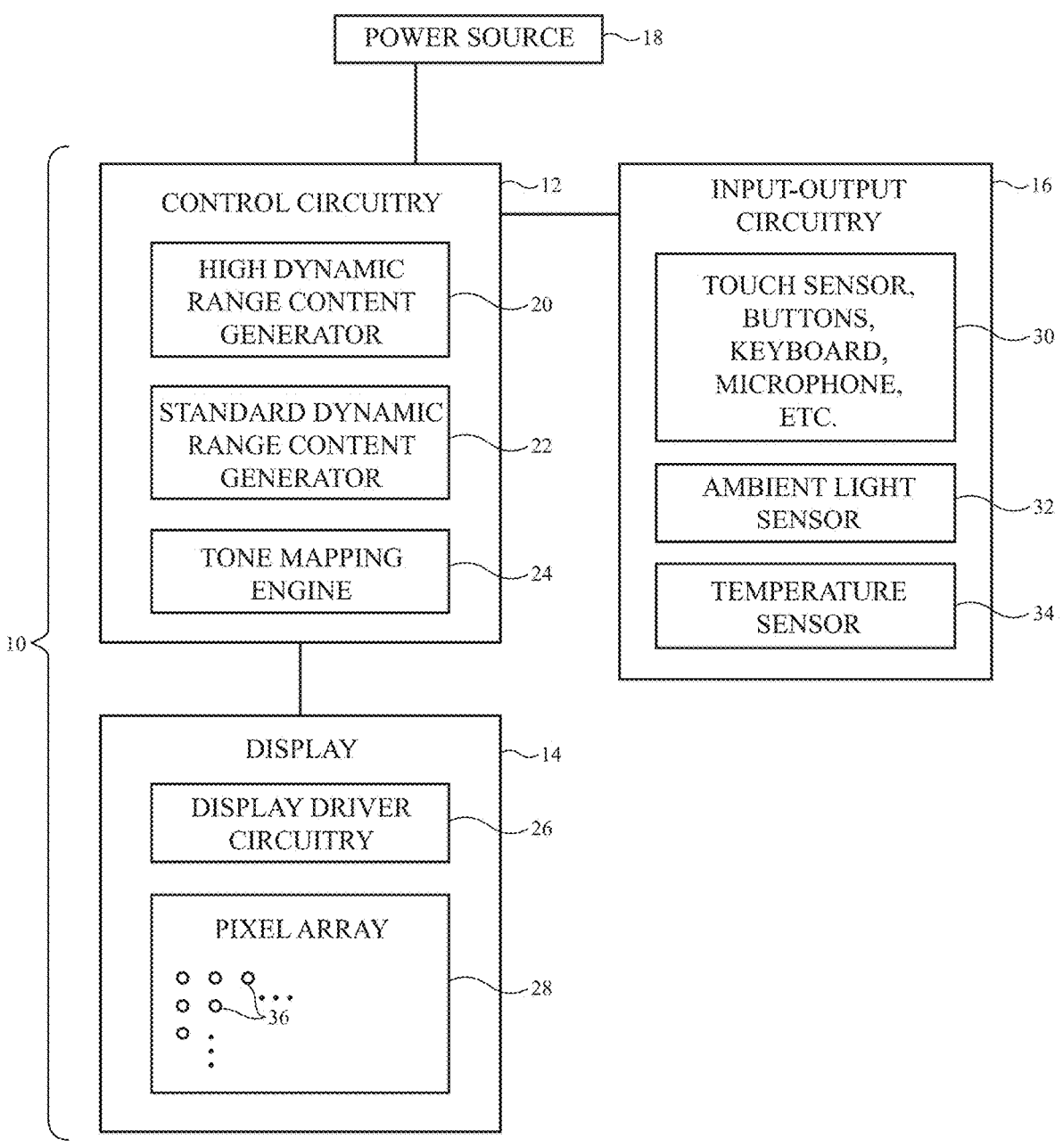
FIG. 1 is a schematic diagram of an illustrative electronic device having a display in accordance with an embodiment.

An illustrative electronic device of the type that may be provided with a display is shown in FIG. 1. As shown in FIG. 1, electronic device 10 may have control circuitry 12. Control circuitry 12 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application-specific integrated circuits, graphics processing units, display driver circuitry such as timing controller integrated circuits and other display driver integrated circuits, and other control circuitry.

Control circuitry 12 is configured to execute instructions for implementing desired control and communications features in device 10. For example, control circuitry 12 may be used in determining pixel luminance levels that are to be used in displaying content for a user. Pixel luminance levels may be based, for example, on ambient light conditions, user-adjusted display brightness settings, statistical information associated with content that is being displayed, and display characteristics. Control circuitry 12 may be configured to perform these operations using hardware (e.g., dedicated hardware such as integrated circuits and thin-film circuits) and/or software (e.g., code that runs on control circuitry 12). Software code for performing control and communications operations for device 10 may be stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Software stored on the non-transitory computer readable storage media may be executed on the processing circuitry of control circuitry 12 during operation of device 10.

Input-output circuitry 16 in device 10 may be used to allow data to be supplied to device 10 from a user or external equipment, may be used to gather environmental data, and may be used to supply data to external equipment and output for a user. Input-output circuitry 16 may include input-output devices 30 such as buttons, joysticks, scrolling wheels, touch pads, keypads, keyboards, microphones, speakers, tone generators, vibrators, cameras, sensors, light-emitting diodes and other status indicators, touch sensitive displays (e.g., touch sensors overlapping pixel arrays in displays), data ports, etc. As shown in FIG. 1, input-output circuitry 16 may include a color ambient light sensor or other ambient light sensor 32 for gathering ambient light measurements (e.g., ambient light levels such as ambient light luminance measurements and/or ambient light color measurements such as color temperature measurements and/or color coordinate measurements). Input-output circuitry 16 may also include temperature sensor circuitry such as one or more temperature sensors. Temperature sensors such as temperature sensor 34 may be used to gather real time information on the operating temperature of device 10 and display(s) associated with device 10.

Power may be supplied to control circuitry 12 and other resources in device 10 using one or more power sources such as power source 18. Power source 18 may be an alternating-current (AC) source such as a wall outlet (mains supply) and/or a direct-current (DC) source such as a battery. During operation, control circuitry 12 can detect whether power is being received from an AC or DC source and can monitor the charge state of the battery.

Device 10 may include one or more internal and/or one or more external displays such as illustrative display 14. Display 14 may be mounted in a common housing with device 10 (e.g., when device 10 is a mobile device such as a cellular telephone, wristwatch device, tablet computer, or laptop computer or when device 10 is an all-in-one device such as a television or desktop computer). In other configurations, display 14 may be coupled to device 10 wirelessly or with a cable (e.g., when device 10 is a desktop computer or a set-top box).

In general, device 10 may be any suitable type of device. Device 10 may, for example, be a computing device laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head (e.g., device 10 may be a head-mounted device), or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. Device 10 (e.g., a portable device) may be exposed to a variety of environmental conditions. For example, ambient light levels and therefore display glare may vary as a portable device is moved between indoors and outdoors environments (as an example).

Electronic device 10 may have a housing. The housing, which may sometimes be referred to as an enclosure or case, may be formed of plastic, glass, ceramics, fiber composites, metal (e.g., stainless steel, aluminum, etc.), other suitable materials, or a combination of any two or more of these materials. The housing may be formed using a unibody configuration in which some or all of the housing is machined or molded as a single structure or may be formed using multiple structures (e.g., an internal frame structure, one or more structures that form exterior housing surfaces, etc.). In laptop computers and other foldable devices, a first portion of the housing may rotate relative to a second portion of the housing (e.g., a display housing in a laptop computer may rotated about a hinge axis relative to a base housing in the laptop computer).

Display 14 may be mounted in the housing. Display 14 may have a rectangular outline and be surrounded by four peripheral edges, may have a shape that is circular or oval, or may have other suitable outlines. Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may have an array 28 of pixels 36 for displaying images for a user (e.g., video, graphics, text, etc.). Display driver circuitry 26 (e.g., thin-film transistor circuitry on display 14 and/or one or more timing-controller integrated circuits and/or other display driver integrated circuits) may be used to display images on pixel array 28. Pixel array 28 may include, for example, hundreds or thousands of rows and hundreds or thousands of columns of pixels 36. To display color images, each pixel 36 may include subpixels of different colors. For example, each pixel 36 may include red, green, and blue subpixels or subpixels of different colors. By varying the relative intensity of light emitted by each subpixel in a pixel, pixel output color can be adjusted. The color cast (white point) of each pixel can be adjusted by modifying the gain associated with each subpixel.

The pixel array of display 14 may be formed from liquid crystal display (LCD) components, an array of electrophoretic display pixels, an array of plasma display pixels, an array of organic light-emitting diode pixels or other light-emitting diodes, an array of electrowetting display pixels, or pixels based on other display technologies. Display 14 may be backlit with an array of locally dimmable light-emitting diodes or other suitable backlight structures. Display 14 may display images with a standard dynamic range (e.g., images that exhibit a contrast ratio of about 1,000:1 between their brightest and darkest pixel luminance values) and/or may display images with a high dynamic range (e.g., images that exhibit a contrast ratio of about 10,000:1 or more between their brightest and darkest luminance values).

In arrangements where device 10 is a head-mounted device, display 14 may be a head-mounted display having one or more display modules mounted in a head-mounted support structure. For example, the head-mounted support structure may include a left optical assembly having a left display that presents images and a left lens through which the images are viewable from a left eye box. A right optical assembly in the head-mounted support structure may include a right display that presents images and a right lens through which the images are viewable from a right eye box. The displays may include arrays of pixels or other display devices to produce images. Displays 14 may, for example, include organic light-emitting diode pixels formed on substrates with thin-film circuitry and/or formed on semiconductor substrates, pixels formed from crystalline semiconductor dies, liquid crystal display pixels, scanning display devices, and/or other display devices for producing images. The lenses may include one or more lens elements for providing display light from displays 14 to respective eye boxes. Lenses may be implemented using refractive glass lens elements, using mirror lens structures (catadioptric lenses), using Fresnel lenses, using holographic lenses, and/or other lens systems. Display 14 may be a see-through display in which an optical combiner is used to view both real-world content and display content, or display 14 may be a pass-through display in which camera-captured images of the real-world environment are displayed on the display and overlaid with computer-generated display content. This is merely illustrative. In general, display 14 may be a head-mounted display in a head-mounted device, may be a handheld display in a handheld electronic device, may be a display in a desktop computer or television, or may be any other suitable display.

During operation, content generators in device 10 (e.g., operating system functions and/or applications running on control circuitry 12) may generate content for display on the pixel array of display 14. As an example, electronic device 10 may include one or more standard dynamic range (SDR)

content generators and/or more high dynamic range (HDR) content generators (e.g., content generators that generate high dynamic range content in accordance with one or more different high dynamic range standards such as the HDR10 Media Profile standard, sometimes referred to as HDR10 and the Hybrid Log-Gamma standard, sometimes referred to as HLG). A luminance value mapping engine such as tone mapping engine 24 may be used to provide content generators with tone mapping parameters (sometimes referred to as luminance value mapping parameters) indicating how the content generators should map content luminance values to display luminance values and/or may be used to directly perform content-luminance-to-display-luminance mapping operations on content luminance values from the content generators. For example, tone mapping engine 24 may supply content generators with tone mapping parameters such as a black level, reference white level, specular white level, skin tone level, and/or gamma and/or slope values to use in producing display luminance values for use in displaying images with pixels 36. Tone mapping engine 24 may be implemented using code running on control circuitry 12 of FIG. 1, control circuitry for device 10 such as display driver circuitry 26, and/or other control circuitry and/or may use hardwired features of the control circuitry in device 10.

Standard dynamic range content is often encoded in gray levels (e.g., 0-255 bits), where 0 corresponds to dark black and 255 corresponds to bright white. High dynamic range content is encoded in luminance levels for each pixel (generally to be displayed for standard viewing conditions such as dim viewing conditions). Device 10 may experience changes in ambient lighting conditions, user brightness settings may be adjusted up and down by a user, the content being displayed on display 14 may exhibit changes such as changes in average pixel luminance, and burn-in risk, and other conditions related to the presentation of content on display 10 may change over time. Device 10 may use tone mapping engine 24 to ensure that content is rendered appropriately for displaying on display 14 in view of these potentially changing conditions and other criteria such as the characteristics of display 14.

Device 10 may use tone mapping, gain maps, look-up tables, and/or other techniques to achieve the desired brightness levels across display 14. In a tone mapping arrangement, control circuitry 12 (e.g., tone mapping engine 24) may be used to map content luminance values to display luminance values using tone mapping curves. The tone mapping curve that is used to map a given set of content luminance values to display luminance values may be selected based on display brightness settings (e.g., a user-selected brightness level, an ambient-light-adapted brightness level, etc.) and/or may be based on user studies, modeling, and laboratory testing that helps establish desired tone mapping schemes for device 10 under a variety of operating conditions (e.g., user brightness settings, ambient light levels, and other operating conditions). These tone mapping schemes can then be implemented by tone mapping engine 24.

With one illustrative configuration, tone mapping engine 24 can select a desired tone mapping curve based on operating conditions such as display brightness settings (e.g., user-defined brightness settings and brightness levels set by device 10 to accommodate a normal power operating mode and a low-power operating mode), ambient conditions (ambient light level and ambient light color), content statistics (e.g., information on average pixel luminance and burn-in risk or other information on operating conditions having a potential impact on display lifetime, quality information, dynamic range information etc.), and display characteristics (e.g., display limitations such as maximum achievable pixel luminance, power constraints such as those due to thermal limitations and/or other considerations), whether device 10 is operating on DC power (power from the battery in source 18 of device 10) or AC power, etc.

During operation, tone mapping engine 24 may obtain information on these operating conditions and may take suitable action to ensure that display 14 displays images satisfactorily. Tone mapping engine 24 may, as an example, remap content so that luminance values that are too high when output from a content generator are reduced by engine 24 before these values are used by display 14. In some situations, luminance values associated with specular highlights of high dynamic range image content may be reduced to avoid making the white of standard dynamic range image content that is being displayed at the same time as the high dynamic range image content appear too dark. Tone mapping engine 24 may also provide content generators such as content generators 20 and/or 22 with tone mapping parameters that inform the content generators of a desired content-luminance-to-display-luminance mapping curve to be used in displaying images on display 14.

If desired, control circuitry 12 may use tone mapping parameters to define content-luminance-to-display-luminance mapping curves. Tone mapping parameters may include a black level, a reference white level, and specular white level. During operation, engine 24 may supply content generators such as content generators 20 and/or 22 with suitable values of these tone mapping parameters, thereby informing content generators 20 and/or 22 of the appropriate tone mapping curve to use. In this way, a set of tone mapping parameters (e.g., three or more tone-mapping parameters, 3-10 tone-mapping parameters, fewer than 5 tone-mapping parameters, etc.) can be used by engine 24 to specify a desired tone mapping relationship for the content generator to follow depending on current operating conditions. If a skin tone mapping parameter is used, its value may, as an example, lie between the reference white level and specular white level or between the reference white level and the black level and may represent skin tones common to human skin. Gamma and/or curve slope values may also be used as tone mapping parameters that specify a content-luminance-to-output-luminance mapping curve.

Tone mapping engine 24 may determine tone mapping parameters based on input such as ambient conditions, brightness settings information, content statistics, and display characteristics. Ambient conditions may include a current ambient light level measured with ambient light sensor 32 and/or a current ambient color (e.g., a color temperature, set of color coordinates, etc.) measured with ambient light sensor 32. As environmental brightness increases, display brightness can be increased to compensate for screen glare. As environmental color shifts (e.g., as a user moves device 10 from a warm indoor lighting environment to a cold outdoor lighting environment), the white point (color cast) of display 14 can be cooled accordingly to avoid undesired color cast effects in displayed images.

Brightness settings information may include a user-selected brightness level and may include a brightness level determined by control circuitry 12 based on power consumption considerations. User brightness settings may be adjusted based on user input from a user on a touch screen, based on user keyboard input, and/or based on other user input. Power-consumption-based brightness level adjustments may be made by control circuitry 12 to help extend battery life. For example, control circuitry 12 may lower the brightness level for display 14 when device 10 enters a low power mode due to thermal conditions such as in response to detection that a temperature level measured with sensor 34 has exceeded a predetermined level, due to detection of a low battery level measured with control circuitry 12, based on detection that a user has placed device 10 in a low power mode to extend battery life, etc. In low power mode, control circuitry 12 may lower the current display brightness setting, may impose a cap on the brightness level, and/or may reduce the luminance of specular highlights or may make other adjustments that help reduce the power consumption of display.

Content statistics may be gathered by analyzing frames of image data produced by content generator(s) 20 and 22 that are being displayed on display 14 or may be provided in the form of metadata (e.g., content category information such as, for example, "movie" or "live sports"). Control circuitry 14 (e.g., a microprocessor, display driver integrated circuits, graphics processing unit circuitry, and/or other control circuitry in device 10) may, for example, maintain running averages of image luminance values (e.g., a running average pixel luminance value for images being displayed on display 14 over multiple image frames) and/or may maintain historical luminance information in a more granular fashion (e.g., on blocks of one or more pixels within pixel array 28) to quantify risks for each of these blocks (e.g., risk of grayish whites in standard dynamic range image content, burn-in risk, etc.). Other content statistics such as information on content quality such as bit depth, dynamic range of image input data (e.g., minimum, mean, and maximum value), compression type and amount, data rate, noise level, metadata-specified quality factors, and other content quality metrics can also be gathered and provided to tone mapping engine 24.

Display characteristics may also be used by tone mapping engine 24. Display characteristics may include information on physical display limitations for display 14. For example, display characteristics may include information on the characteristics of pixel array 28 and display 14 (e.g., maximum achievable specular white level, display resolution, contrast ratio, bit depth, etc.). These display characteristics may be stored in control circuitry 12 during manufacturing (e.g., when display 14 is built into device 10) and/or may be obtained from display 14 when display 14 is coupled to device 10 (e.g., when display 14 is a stand-alone display). A user may also supply control circuitry 12 with display characteristics information (e.g., by entering this information using a keyboard or other input-output device). In some configurations, display characteristics may be set by default and/or retrieved from a database of display characteristics maintained in device 10 (e.g., a database of stand-alone display models).

During operation, content generators 20 and 22 may produce content to be displayed on display 14. Content generators 20 and 22 may, for example, render game images in a video game, may retrieve stored movie data and provide corresponding video frames to be displayed on display 14, may produce still image frames associated with an operating system function or application program, and/or may produce other content for displaying on display 14. The content from content generators 20 and 22 may include standard dynamic range content and/or high dynamic range content.

Tone mapping engine 24 may use information on ambient conditions, brightness settings information, content statistics, and/or display characteristics to determine how original content values should be mapped to display content values (e.g., to determine how to map content luminance values to display luminance values in accordance with mapping curves). To ensure that content is displayed appropriately on display 14, tone mapping engine 24 can provide content generators 20 and 22 with tone mapping parameters to use in performing luminance mapping operations and/or can implement luminance mapping for content generators 20 and 22.

In some configurations, content generators 20 and 22 may be capable of adjusting content luminance values internally. In these situations, tone mapping engine 24 can supply content generators 20 and 22 with tone mapping parameters such as a black level, reference white level, specular white level, skin tone level, and the slope or gamma of the mapping curve. The tone mapping parameters inform content generators 20 and 22 of an appropriate mapping curve to use in supplying content to display 14.

In other configurations, tone mapping engine 24 may apply a desired content-luminance-to-display-luminance mapping (e.g., a mapping defined by tone mapping parameters such as black level, reference white level, and specular white level) to ensure that the luminance of display content is adjusted appropriately (e.g., so that the content is remapped in accordance with a desired content-luminance-to-display luminance mapping to produce corresponding remapped content for displaying on display 14).

In some situations, only standard dynamic range content from standard dynamic range content generator 22 is displayed on display 14. Standard dynamic range content generator 22 may be associated with displaying standard video and images, on-screen menus, pop-up boxes, selectable on-screen buttons, text documents (e.g., in word processing applications), web pages (e.g., in web browser applications), standard dynamic range graphics, user interface elements, and other standard dynamic range content. In these situations, a tone mapping may be selected so that the standard dynamic range content is displayed satisfactorily on display 14. As an example, the standard dynamic range content may be displayed with a maximum luminance (specular white level, peak brightness value, etc.) that is lower than the maximum possible pixel luminance supported by the hardware of display 14. This approach may help conserve power while displaying the content for a user.

In other situations, only high dynamic range content from high dynamic range content generator 20 is displayed on display 14. The high dynamic range content supplied by high dynamic range content generator 20 has a higher dynamic range than the standard dynamic range content from standard dynamic range content generator 22. To take advantage of the larger dynamic range associated with the content from content generator 20 (e.g., to ensure that specular highlights are sufficiently bright for a viewer), a tone mapping may be selected that allows the brightest pixels in the high dynamic range content to be displayed with elevated luminance levels relative to the brightest pixels in the standard dynamic range content. In other words, the brightest white used for high dynamic range content (e.g., the specular highlights in a high dynamic range photograph, movie, etc.) may be higher than the brightness white used for standard dynamic range content (e.g., the white background of a webpage that is displayed by a web browser application, the white background of a text document that is displayed by a word processing application, etc.).

It is sometimes desirable to display content that has one or more areas of standard dynamic range content and one or more areas of high dynamic range content. For example, high dynamic range picture-in-picture content may be displayed on standard dynamic range background content using a picture-in-picture arrangement. The background content may, for example, extend across all of display 14. The picture-in-picture content may partly cover the background content. As an example, the picture-in-picture content may be displayed in a rectangular area that overlaps some of the background area while allowing other portions of the background area to be viewed by a user.

In another illustrative arrangement, a split-view window approach may be used in which high dynamic range content on one side of display 14 (e.g., the left side) is simultaneously displayed with standard dynamic range content on another side of display 14 (e.g., the right side). Slide-over content arrangements in which an area of standard dynamic range content slides over and progressively covers increasing portions of a high dynamic range area on display 14 or in which high dynamic range content slides over standard dynamic range content on display 14 may also be used. In some arrangements, standard dynamic range text such as text for editing buttons, subtitles, and closed captioning information may be overlaid on high dynamic range content.

When standard dynamic range and high dynamic range areas are displayed simultaneously, the black level, reference white level, and specular white level for each of these areas can be independently adjusted to ensure that the content on display 14 is presented satisfactorily (e.g., to avoid situations in which some of the content appears too dark or too bright compared to other content, to avoid situations in which white standard definition text appears grayish rather than white when adjacent to content with bright specular highlights, etc.). For example, tone mapping engine 24 can detect when mixed standard dynamic range and high dynamic range is being presented (or is about to be presented) on display 14 and can generate corresponding standard dynamic range and high dynamic range tone mapping parameters that balance the appearances of the standard dynamic range and high dynamic range areas to avoid undesired visual effects while taking into account factors such as ambient light conditions, content statistics, user brightness settings, and display characteristics. Transitions between standard dynamic range and high dynamic range content can be performed smoothly by dynamically adjusting tone mapping parameter values while transitioning. For example, if high dynamic range content with a high specular white level is being replaced by standard dynamic range content with a low specular white level, the specular white level can be transitioned between the high and low levels over a suitable transition period (e.g., 0.5-20 s, 0.5-50 s, 0-50 s, 1-100 s, more than 3 s, less than 20 s, or other suitable transition period) to avoid an overly abrupt transition. When operating conditions change (e.g., an ambient light level changes), the sets of respective tone mapping parameters associated with standard dynamic range area(s) on display 14 and high dynamic range area(s) can be adjusted accordingly.

Figure 2:
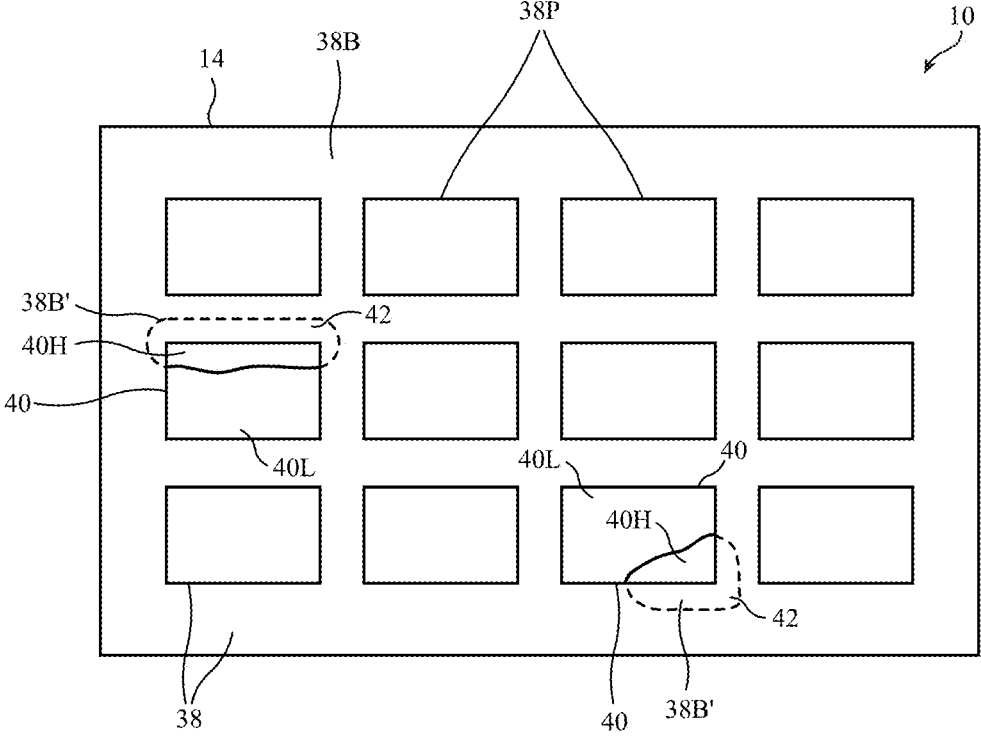
FIG. 2 is a front view of an illustrative display that is displaying high dynamic range image content and standard dynamic range image content with one or more regions of locally boosted contrast in accordance with an embodiment.

Consider, as an example, the display content of FIG. 2. In the example of FIG. 2, display 14 is being used to display both standard dynamic range image content 38 and high dynamic range image content 40. Standard dynamic range image content 38 may include background 38B and images 38P (as an example). High dynamic range image content 40 may include images with highlights 40H and lowlights 40L.

If the difference between the white level (e.g., the peak brightness value) of high dynamic range image content 40 and the white level (e.g., the peak brightness value) of standard dynamic range image content 38 is high (e.g., if the headroom for high dynamic range image content 40 is high), standard dynamic range image content 38 may appear to have grayish whites if care is not taken. The contrast between the two white levels may be more or less noticeable depending upon the relative amounts of screen coverage of standard dynamic range image content 38 and high dynamic range image content 40. In particular, the difference may become more noticeable when high dynamic range image content 40 consumes less screen real estate (e.g., a lower percentage of screen coverage) within the image frame than standard dynamic range image content 38, as in the example of FIG. 2 (e.g., when display 14 is displaying thumbnail images of photographs that include both high dynamic range photographs and standard dynamic range photographs).

Device 10 may implement one or more techniques for avoiding grayish whites in standard dynamic range image content when it is displayed with high dynamic range image content. In one illustrative arrangement, control circuitry 12 may reduce the amount of headroom available for high dynamic range image content 40. For example, in scenarios of the type shown in FIG. 2 where most of the screen coverage of display 14 is consumed by standard dynamic range image content, control circuitry 12 may reduce the peak brightness of highlights 40H to avoid grayish whites in standard dynamic range image content 38B and 38P.

If desired, control circuitry 12 may determine headroom for high dynamic range image content 40 based on spatial statistics such as the size of the highlight region in high dynamic range image content 40. Images with larger size highlights (e.g., larger groups of bright pixels clustered together) may have a more perceivable effect on the appearance of surrounding standard dynamic range content 38 than images with smaller highlights. Control circuitry 12 may therefore assign lower amounts of headroom to for high dynamic range image content 40 with larger size highlights when compared to high dynamic range image content 40 with smaller highlights.

Average pixel luminance levels may also play a factor in determining how noticeable the difference between the peak brightness levels of standard dynamic range image content 38 and high dynamic range image content 40. If, for example, high dynamic range image content 40 has relatively low average pixel luminance levels (e.g., if high dynamic range image content 40 is mostly dark image content), the difference between the two peak brightness levels may be less noticeable than in scenarios in which the high dynamic range image content 40 has relatively high pixel luminance levels (e.g., in which high dynamic range image content 40 is mostly light image content). Control circuitry 12 may reduce the amount of headroom available for high dynamic range image content 40 as the average pixel luminance level increases, if desired.

Another technique for avoiding grayish whites in standard dynamic range image content 38 is to globally increase the contrast of standard dynamic range image content 38 across display 14. With this type of arrangement, control circuitry 12 may adjust the reference white level used for standard dynamic range image content 38 by increasing the peak brightness of standard dynamic range image content 38B and 38P across display 14. While this may avoid the appearance of grayish whites in standard dynamic range image content 38, globally increasing the peak brightness of standard dynamic range image content 38 may affect the user's brightness adaptation state. For example, the user may perceive highlights 40H to be less bright as the user's adaptation state adapts to the brighter whites in the globally modified standard dynamic range image content.

In another technique, control circuitry 12 may locally increase the contrast of standard dynamic range image content 38 only within the vicinity of highlights 40H in display 14. For example, display 14 may include regions 42 of locally boosted contrast that are adjacent to highlights 40H of high dynamic range image content 40. This may be achieved by locally adjusting the reference white in regions 42 by increasing the peak brightness of standard dynamic range image content 38 in regions 42. As shown in FIG. 2, for example, standard dynamic range image content 38B includes content 38B' in regions 42. Standard dynamic range image content 38B' in regions 42 (sometimes referred to as contrast-boosted standard dynamic range image content 38B') may have a brighter reference white level than standard dynamic range image content 38 that is not located in regions 42. The brighter reference white of content 38B' in regions 42 may be less than or equal to the specular white level of highlights 40H, if desired.

As shown in FIG. 2, regions 42 of locally boosted contrast may be located radially around regions of highlights 40H. The size and shape of regions 42 may be based on the size and shape of highlights 40H. As highlights 40H shift to different locations across display 14 (e.g., during a movie, when a window is moved, etc.), regions 42 of locally boosted contrast may shift and follow the location of highlights 40H. Regions 42 may give the appearance of light "spilling" from highlights 40H onto surrounding standard dynamic range content 38. This may create a visual effect that is perceivable or not perceivable by the user, depending on the desired strength of the contrast boost in regions 42.

Regions 42 may be created based on a map of gain values (e.g., a gain map) that is calculated based on highlights 40H. For example, control circuitry 12 may first separate high dynamic range image content 40 from standard dynamic range image content 38. Control circuitry 12 may then extract highlights 40H from high dynamic range image content 40. This may include, for example, selecting all pixels that have brightness values that exceed the peak brightness of standard dynamic range image content 38 (e.g., if the peak brightness of standard dynamic range image content 38 is represented by a value of one, then control circuitry 12 may extract all pixels in high dynamic range image content 40 having a value greater than one). Pixels that have brightness values that exceed the peak brightness of standard dynamic range image content 38 may sometimes be referred to as highlights 40H. The remaining high dynamic range content 40L may include lowlights and may include other content with a peak brightness value less than or equal to the peak brightness of standard dynamic range image content 38.

Upon extracting highlights 40H, control circuitry 12 may generate a map of gain values. The map may cover all of display 14 or may cover only a portion of the display surrounding highlights 40H. The map may include gain values that are highest (e.g., strongest) in the vicinity of highlights 40H and that taper off in strength at farther distances from highlights 40H. Control circuitry 12 may multiply standard dynamic range image content 38 with the map of gain values to obtain modified standard dynamic range image content 38B'. By using multiplication, black colors in standard dynamic range image content 38 may not be affected and may remain black, while lighter colors may receive a luminance boost relative to the darker colors to locally increase contrast in regions 42.

If desired, control circuitry 12 may dynamically adjust the strength of the contrast boost in region 42, as well as the size of region 42 on display 14 where contrast is boosted, based on the size of display 14, the distance between display 14 and the user (e.g., as measured by a proximity sensor in device 10), the percentage of the screen size that is covered by high dynamic range image content 40, the type of content that is being displayed by high dynamic range image content 40 and/or standard dynamic range image content 38, based on whether the active window on display 14 is associated with high dynamic range image content 40 or standard dynamic range image content 38, based on whether the image content is displayed in a grid view (e.g., a grid of thumbnail images as in the example of FIG. 2) or an embedded view (e.g., a picture-in-picture arrangement, an image sent in an e-mail or messaging application, etc.), based on whether the image content is displayed in a full-screen mode or a split-screen mode, based on which application is being used to display the image content (e.g., a photo editing or movie editing application versus a messaging application), based on user settings and/or user preferences, and/or based on other factors.

In general, control circuitry 12 may implement one or more techniques, alone or in combination, for avoiding grayish whites in standard dynamic range image content. This may include locally boosting contrast in regions 42 (e.g., without adjusting contrast in other regions of standard dynamic range image content 38), globally boosting contrast across standard dynamic range image content 38, and/or adjusting headroom available for high dynamic range image content 40 by locally or globally reducing the peak brightness of high dynamic range image content 40.

If display 14 is displaying high dynamic range images or videos (e.g., with highlights 40H having different amounts of screen coverage) at the same time, control circuitry 12 may use different amounts of contrast boosting in different regions 42 of standard dynamic range image content 38 adjacent to the different regions of highlights 40H. For example, high dynamic range image content 40 within a given image frame displayed on display 14 may include first and second high dynamic range images or videos (e.g., first and second high dynamic range thumbnail images as in the example of FIG. 2, multiple high dynamic range videos, a combination of high dynamic range videos and images, etc.) with different amounts of highlights 40H. Control circuitry 12 may use a larger region 42 of contrast boost for standard dynamic range image content 38 that surrounds the larger region of highlights 40H and may use a smaller region 42 of contrast boost for standard dynamic range image content 38 that surrounds the smaller region of highlights 40H. Regions of standard dynamic range content 38 that do not fall within regions 42 may be unmodified, if desired.

When transitioning between different amounts of localized contrast boosting and/or when moving regions 42 across display 14, control circuitry 12 may apply a temporal filter to ensure smooth transitions over time (e.g., as high dynamic range image content 40 moves across display 14).

The use of gain mapping to achieve the desired peak brightness level for standard dynamic range image content is merely illustrative. If desired, target peak brightness levels for standard dynamic range image content may be achieved using tone mapping, using average pixel luminance adjustments, peak luminance adjustments, and/or using other techniques. Locally increasing contrast in regions 42 of standard dynamic range image content 38 using a gain map may sometimes be described herein as an illustrative example.

In general, when both standard dynamic range content and high dynamic range content are displayed simultaneously on display 14, the mapping curve and/or gain map used for presenting the standard dynamic range content 38 and/or the mapping curve and/or gain map used for presenting the high dynamic range content 40 may be adjusted to present the content in a visually appealing fashion while taking into account current operating conditions such as ambient light level, user brightness setting, content statistics, and display characteristics. Instead of or in addition to adjusting the gain map used for localized regions 42 of standard dynamic range image content 38, control circuitry 12 may adjust the tone mapping curve used for high dynamic range image content 40 to make high dynamic range image content 40 appear slightly less bright in the vicinity of standard dynamic range content 38.

Figure 3:
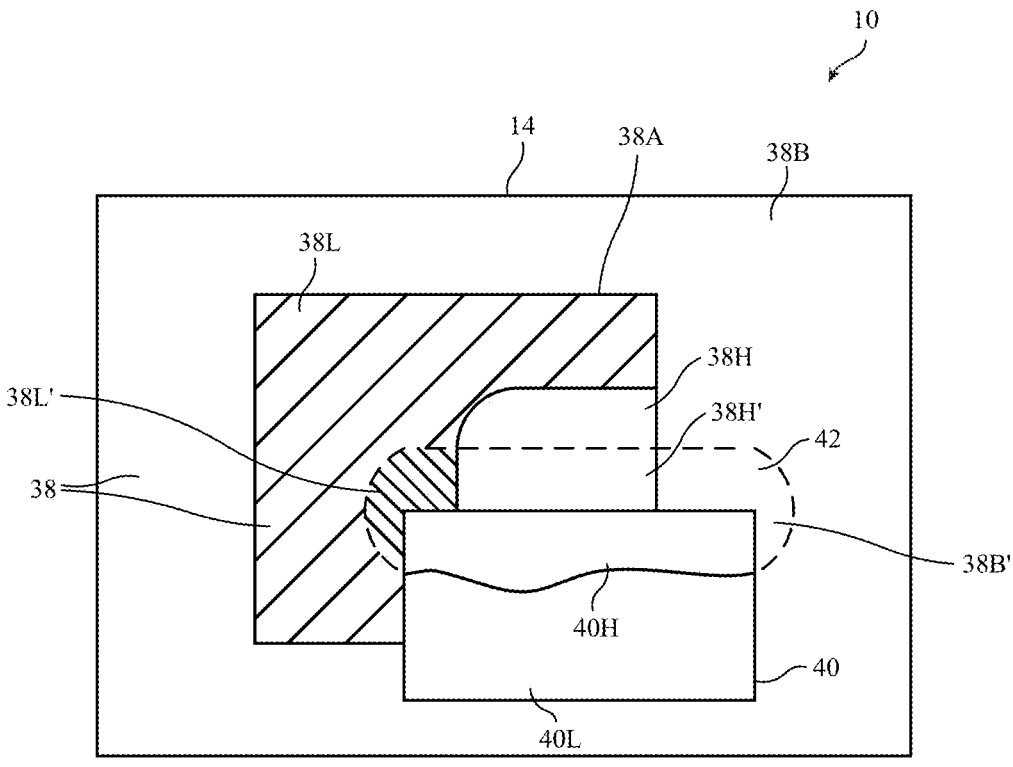
FIG. 3 is a front view of an illustrative display that is displaying high dynamic range image content in front of standard dynamic range image with one or more regions of locally boosted contrast in accordance with an embodiment.

In the example of FIG. 3, high dynamic range image content 40 is located in an active, selected window that is in front of other image content. Standard dynamic range image content 38 includes background 38B and application window 38A. Application window 38A may be a messaging application, a web browsing application, and/or any other suitable application or image content. Standard dynamic range image content 38 may include black content 38L and non-black content 38H. Black content 38L may be black whereas non-black content 38H may be non-black content such as white content, gray content, colored content, and/or any other suitable non-black content. High dynamic range image content 40 may include highlights 40H and lowlights 40L. Highlights 40H may have a specular white level that is brighter than the reference white level of standard dynamic range image content 38.

To avoid the appearance of grayish whites in standard dynamic range image content 38 in the vicinity of highlights 40H, a gain map (e.g., a map of gain values) may be applied to a localized region 42 of standard dynamic range image content 38 around highlights 40H. Region 42 may have a shape and size that corresponds to the shape and size of highlights 40H. In the example of FIG. 3, region 42 spans across background 38B', black content 38L', and non-black content 38H'. Pixel values for pixels that fall within region 42 may be multiplied with the map of gain values. Black regions 38L' may be unchanged by the multiplication (since pixels that are displaying black have pixel values of zero, multiplying those pixel values by the map of gain values results in unmodified black pixels). In other words, pixel values associated with black content 38L' may be unmodified relative to black content 38L outside of region 42. In non-black regions 38H', on the other hand, pixel values may receive a luminance boost relative to non-black regions 38H. In background 38B', black pixels may be unmodified by the multiplication while non-black pixels may receive a luminance boost. This results in a local contrast boost in regions 42 relative to other regions of standard dynamic range content 38 that are outside of region 42. The gain map that is used to boost contrast in regions 42 may be temporally averaged (e.g., to avoid a flashlight effect). While the reference white level of standard dynamic range image content 38 outside of region 42 may remain modified, the reference white level of content within region 42 may be adjusted to be brighter than the reference white level (and less bright or equally as bright as the specular white level of highlights 38H).

Figure 4:
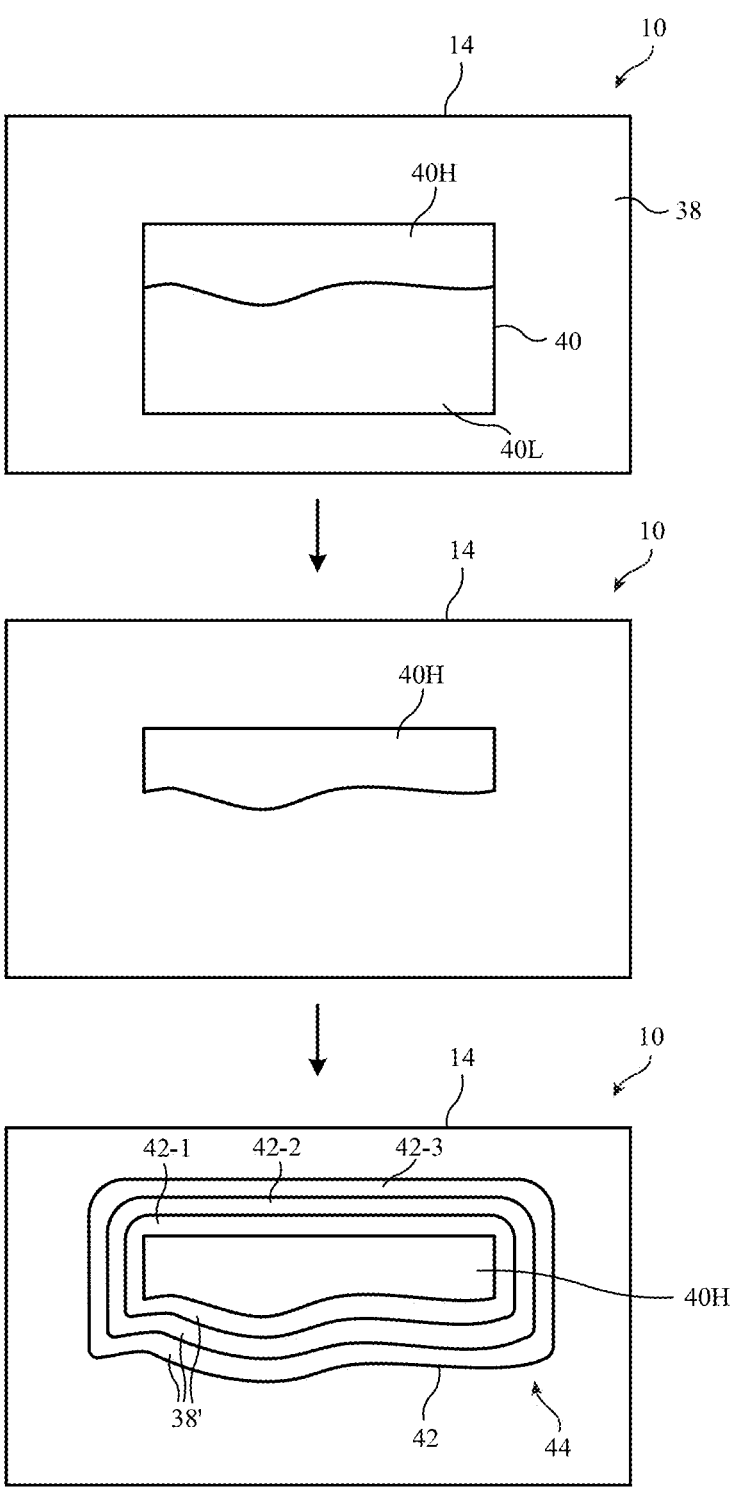
FIG. 4 is a diagram showing illustrative steps involved in generating a map of gain values for locally boosting contrast of standard dynamic range content based on extracted highlights from high dynamic range content in accordance with an embodiment.

FIG. 4 is a diagram showing illustrative steps involved in generating a map of gain values (e.g., a local gain map) to locally increase contrast of standard dynamic range image content 38 in the vicinity of high dynamic range highlights 40H.

As shown in FIG. 4, control circuitry 12 may first isolate high dynamic range image content 40 in a given display frame (e.g., by detaching pixels in high dynamic range color space from pixels in standard dynamic range color space). This allows control circuitry 12 to analyze pixel values in high dynamic range color space (as shown at the top of FIG. 4).

From high dynamic range image content 40, control circuitry 12 may extract pixels having pixel values that exceed that peak brightness of standard dynamic range image content 38 (e.g., pixel values that exceed the reference white value used for standard dynamic range image content 38). This may include extracting highlights 40H (as shown in the middle of FIG. 4).

Control circuitry 12 may generate a gain map such as gain map 44 (at the bottom of FIG. 4) based on highlights 40H. The gain map 44 may include gain values in regions 42. Region 42 may form a border (e.g., a peripheral loop, a halo, etc.) around highlights 40H. Gain map 44 may have gradient gain values that are strongest directly adjacent to highlights 40H and that taper off in strength at farther distances from highlights 40H. For example, the strongest gain values of gain map 44 may be located in region 42-1 that directly border highlights 40H. The gain values of gain map 44 in region 42-2 that directly borders region 42-1 may be lower than the gain values of gain map 44 in region 42-1. The gain values of gain map 44 in region 42-3 that directly borders region 42-2 may be lower than the gain values of gain map 44 in region 42-2. This creates a gradient of contrast boosting in region 42 that has the strongest contrast boost in region 42-1 directly bordering highlights 42H and that gradually tapers off to the lowest contrast boost in region 42-3 (with no contrast boost outside of regions 42). The example of FIG. 4 in which region 42 includes three discrete regions of different amounts of contrast boosting is merely illustrative. If desired, the amount of contrast boosting may gradually and continuously taper off from a maximum value at the border of highlights 40H to a minimum value at some distance away from highlights 40H. The distance from highlights 40H at which the contrast boost tapers off to zero (e.g., the size of region 42), the strength of the contrast boost within region 42, and other characteristics of region 42 may be based on the size of highlights 40H, the shape of highlights 40H, the size of display 14, the distance between display 14 and the user, the percentage of screen coverage allocated to high dynamic range image content 40, the type of content in high dynamic range image content 40 and/or standard dynamic range image content 40, and/or other factors.

Figure 5:
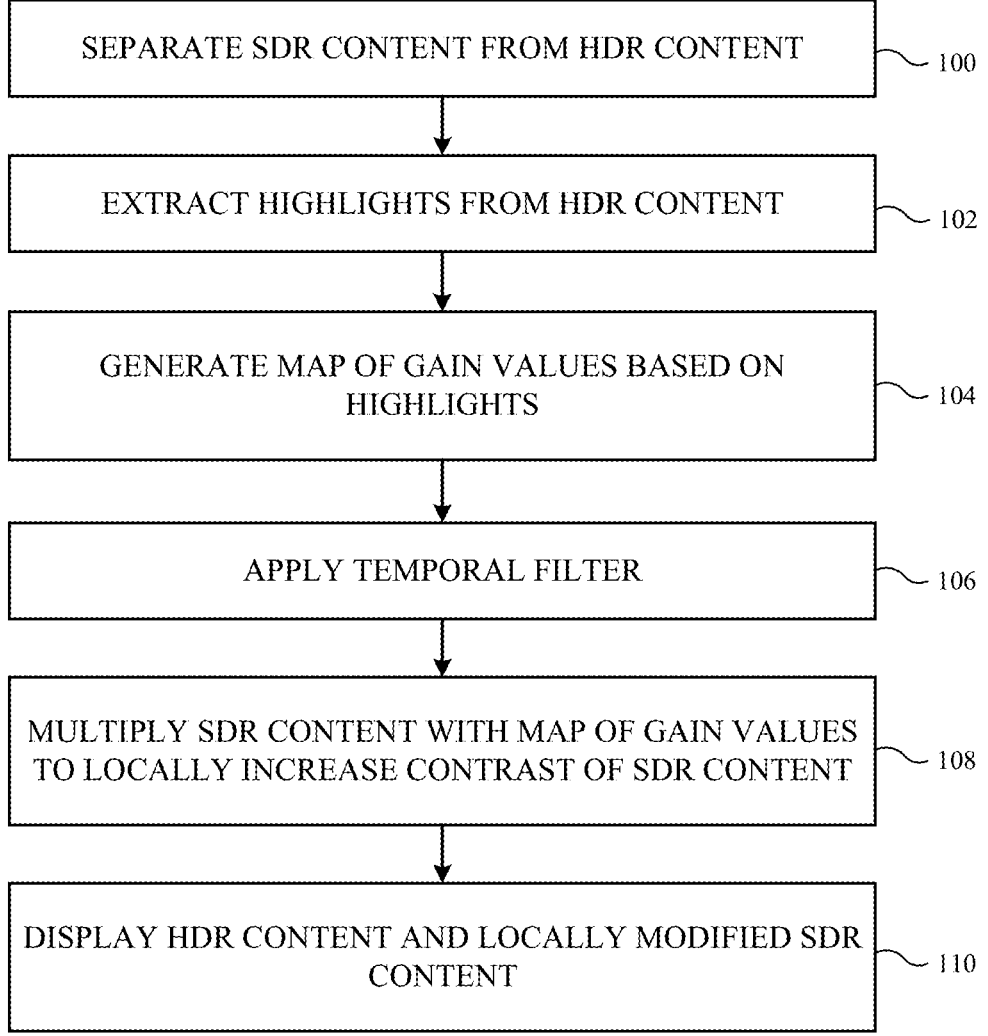
FIG. 5 is a flow chart of illustrative steps involved in displaying high dynamic range image content and standard dynamic range image content with one or more regions of locally boosted contrast in accordance with an embodiment.

FIG. 5 is a flow chart of illustrative steps involved in displaying high dynamic range images together with standard dynamic range images while locally boosting contrast in one or more portions of the standard dynamic range image content.

During the operations of block 100, control circuitry 12 may separate high dynamic range image content 40 from standard dynamic range image content 38. This may include, for example, separating pixels in high dynamic range color space from pixels in standard dynamic range color space.

During the operations of block 102, control circuitry 12 may extract highlights 40H from high dynamic range image content 40. This may include, for example, selecting pixels that have brightness values that exceed the peak brightness of standard dynamic range image content 38. If the reference white level of standard dynamic range image content 38 is represented by a value of one, for example, then control circuitry 12 may extract pixels from high dynamic range image content 40 that is represented by a value greater than one.

During the operations of block 104, control circuitry 12 may generate a map (e.g., map 44) of gain values (e.g., a gain map) based on the extracted highlights 40H. If there are multiple high dynamic range images on display 14 each with a different region of highlights 40H, then control circuitry 12 may generate a map 44 of gain values for each different region of highlights 40H. If desired, the different maps 44 may be combined into a single composite map that accounts for all regions of highlights 40H on display 14 (e.g., by adding the different maps 44 on top of one another, by selecting a maximum value from a given one of the maps 44, etc.).

If desired, gain map 44 may be generated independently from highlights 40H and/or may be generated based on high dynamic range image 40 as a whole. For example, gain map 44 may be generated based on the type of content in high dynamic range image 40. Control circuitry 12 may generate gain map 44 based on the type of application that is being used to display high dynamic range image 40 (e.g., a photos application, a messaging application, a web browsing application, a movie application, etc.) and/or based on content statistics such as average pixel luminance levels associated with high dynamic range image 40. Generating gain map 44 based on highlights 40H is merely illustrative. Gain map 44 may have constant values, may have gradient values, or may have other suitable values depending on the type of content within high dynamic range image 40.

The size and strength of gain map 44 for each region of highlights 40H may be based on the size of highlights 40H, the shape of highlights 40H, the size of display 14, the distance between display 14 and the user (e.g., as measured by a proximity sensor or other distance sensor in device 10), the brightness of ambient light (e.g., as measured by an ambient light sensor in device 10), a user's adaptation state (e.g., as measured using one or more eye tracking sensors in device 10 or in an external device), the location of the user's gaze (e.g., as measured by a gaze tracking sensor in device 10), the percentage of screen coverage consumed by high dynamic range image content 40, the type of content in high dynamic range image content 40 and/or standard dynamic range image content 40, and/or other factors. If ambient light levels are high, for example, higher strength values may be used in map 44, while dim ambient lighting conditions may allow lower strength values to be used in map 44. Similarly, higher strength values may be used when a user is bright-adapted, whereas lower strength values may be used when a user is dark-adapted.

If desired, content statistics may be accounted for when determining the strength and size of map 44. For example, while black content may be unmodified, it may also be desirable to avoid modifying dark but not black content that is adjacent to black content (e.g., to avoid a "glow" in the dark content). This is merely illustrative, however. If desired, dark content may receive a luminance boost relative to black content. In some arrangements, smaller regions of highlights may result in higher strength gain values in map 44.

If desired, the strength of map 44 may be based on user preferences and/or user settings. The strength of the gain map may be high enough to avoid the appearance of grayish whites in standard dynamic range image content 38, but low enough to remain unnoticeable to the user (e.g., the visual effect of regions 42 may be below the visual detection threshold), or the strength of the gain map may be sufficiently high to allow regions 42 to be visually detectable by the user.

During the operations of optional block 106, a temporal filter may be applied to map 44 to avoid sharp or abrupt changes in luminance on display 14 over time. For example, if highlights 40H are moving around display 14 (e.g., during a movie that is playing on display 14), control circuitry 12 may apply a temporal filter to smooth the transitions in brightness as highlights 40H move from one location to another. This is merely illustrative. If desired, the operations of block 106 may be omitted.

During the operations of block 108, control circuitry 12 may multiply standard dynamic range image content 38 with map 44 to obtain localized regions 42 of increased contrast in the vicinity of highlights 40H. Modification of image content such as standard dynamic range image content 38 using map 44 may be performed in any suitable color space. In one color space, for example, colors may be represented using values ranging from zero (representing black) to one (representing reference white for standard dynamic range image content 38) to greater than one (representing highlights and/or specular white levels in high dynamic range image content 40). This is merely illustrative. If desired, map 44 may be applied in a linear or perceptual color space that impacts some colors (e.g., saturated colors) differently from others (e.g., neutral colors), depending on the color space used.

During the operations of block 110, control circuitry 12 may combine the modified standard dynamic range image content 38 (e.g., contrast-boosted standard dynamic range image content 38B' of FIG. 2, contrast-boosted standard dynamic range image content 38L' and 38H' of FIG. 3, etc.) and the unmodified standard dynamic range image content 38 with unmodified high dynamic range image content 40 into a composite image and the composite image may be displayed on display 14. Locally boosting contrast in certain portions of standard dynamic range image content 38 helps avoid the appearance of grayish whites in standard dynamic range image content 38, while also allowing high dynamic range image content 40 to take full advantage of the dynamic range of display 14 (e.g., high dynamic range image content 40 may have a peak brightness value that is equal to the peak brightness that display 14 is capable of producing, if desired). Arrangements in which control circuitry 12 additionally or instead reduces the headroom available for high dynamic content 40 by reducing the peak brightness of highlights 40H in the vicinity of standard dynamic range image content 38 may also be used, if desired.

In some scenarios, control circuitry 12 may not locally increase contrast around a given highlight region. For example, if the highlight region 40H is associated with a logo or other icon, it may be desirable to maintain the contrast of the standard dynamic range image content 38 surrounding the logo.

The foregoing is merely illustrative and various modifications can be made to the described embodiments. The foregoing embodiments may be implemented individually or in any combination.

What is claimed is:

1. An electronic device, comprising:
a display configured to display high dynamic range image content and standard dynamic range image content, wherein:
the high dynamic range image content has highlights; and
the standard dynamic range image content has regions of locally boosted contrast surrounding the highlights.

2. The electronic device defined in claim 1 further comprising control circuitry configured to generate a map of gain values based on the highlights.

3. The electronic device defined in claim 2 wherein the control circuitry is configured to multiply the standard dynamic range image content with the map of gain values to produce the regions of locally boosted contrast.

4. The electronic device defined in claim 3 wherein the map of gain values has a gradient of strength that is higher at closer distances to the highlights and lower at farther distances from the highlights.

5. The electronic device defined in claim 3 wherein the highlights comprise first highlights in a first region of the display and second highlights in a second region of the display, wherein the control circuitry is configured to generate a first map of gain values based on the first highlights and a second map of gain values based on the second highlights, and wherein the first map is different from the second map.

6. The electronic device defined in claim 5 wherein the map of gain values is a composite of the first and second maps.

7. The electronic device defined in claim 3 wherein the standard dynamic range image content comprises black content in the regions and non-black content in the regions and wherein the black content in the regions is unmodified by the map of gain values.

8. The electronic device defined in claim 3 wherein the control circuitry is configured to apply a temporal filter to the map of gain values.

9. The electronic device defined in claim 3 wherein the standard dynamic range image content that does not fall within the regions of locally boosted contrast is unmodified by the map of gain values and has a reference white that is less bright than a modified reference white of the standard dynamic range image content in the regions of locally boosted contrast.

10. The electronic device defined in claim 1 wherein a shape and a size of the regions of locally boosted contrast are based on at least one of: a size of the display, a distance between the display and a user, and a percentage of screen coverage consumed by the high dynamic range image content.

11. An electronic device, comprising:
a display configured to display high dynamic range image content and standard dynamic range image content, wherein:
the high dynamic range image content comprises highlights; and
the standard dynamic range image content comprises first and second regions, wherein the first region has a first white level and the second region has a second white level that is brighter than the first white level, and wherein the second region surrounds the highlights.

12. The electronic device defined in claim 11 further comprising control circuitry configured to:
generate a gain map based on the highlights; and
multiply the standard dynamic range image content with the gain map to locally boost contrast in the second region.

13. The electronic device defined in claim 12 wherein the first region of the standard dynamic range image content is unmodified by the gain map.

14. The electronic device defined in claim 13 wherein the second region of the standard dynamic range image content comprises black content and non-black content, wherein the black content is unmodified by the gain map and the non-black content is modified by the gain map.

15. The electronic device defined in claim 11 wherein a shape and a size of the second region are based on at least one of: a size of the display, a distance between the display and a user, and a percentage of screen coverage consumed by the high dynamic range image content.

16. A method for displaying high dynamic range image content and standard dynamic range image content on a display in an electronic device, the method comprising:

with control circuitry in the electronic device, extracting highlights from the high dynamic range image content;

with the control circuitry, generating a map of gain values based on the highlights; and with the control circuitry, multiplying the map of gain values with the standard dynamic range image content to produce at least one region of locally increased contrast in the standard dynamic range image content.

17. The method defined in claim 16 wherein the map has a gradient of strength that is higher at closer distances to the highlights and lower at farther distances from the highlights.

18. The method defined in claim 16 further comprising:

with the display, displaying a composite image that includes the high dynamic range image content and the standard dynamic range image content including the at least one region of locally increased contrast.

19. The method defined in claim 18 wherein the high dynamic range image content is unmodified by the map.

20. The method defined in claim 16 further comprising:

with the control circuitry, applying a temporal filter to the map.

\* \* \* \* \*